United States Patent Office 2,927,556
Patented Mar. 8, 1960

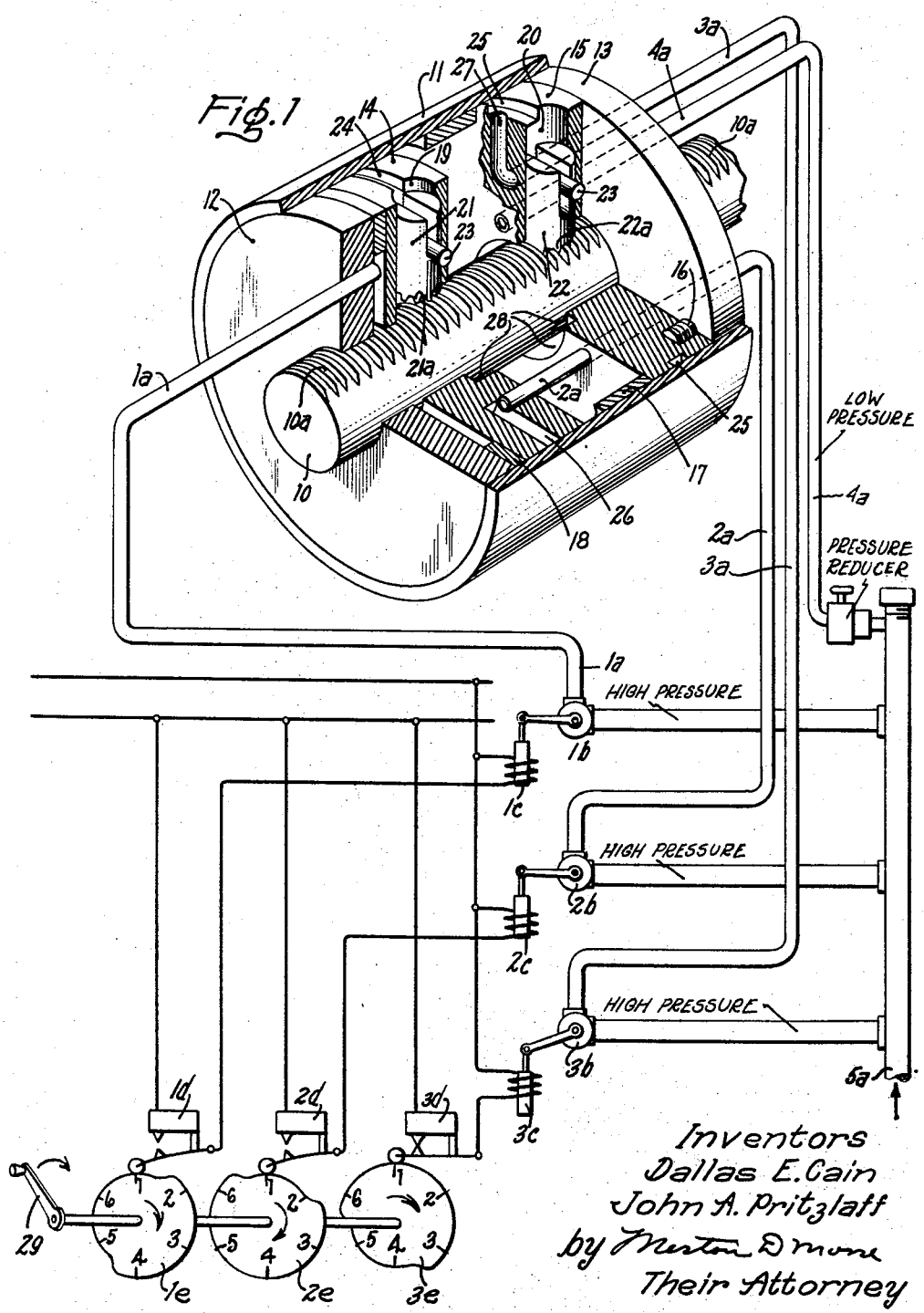

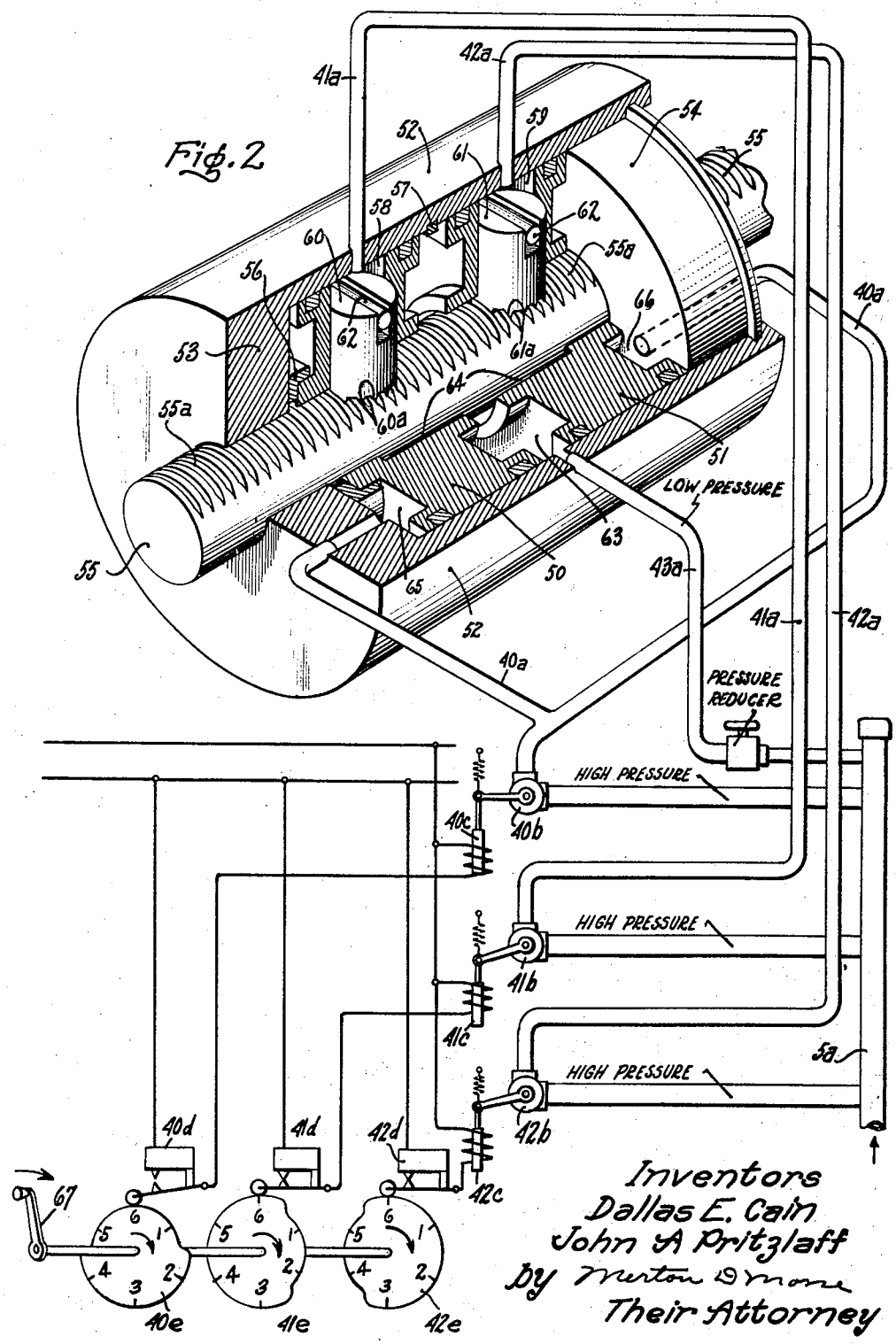

2,927,556

DEVICE FOR PRODUCING STEP BY STEP MOTION IN DIFFERENT DIRECTIONS

Dallas E. Cain, Scotia, and John A. Pritzlaff, Schenectady, N.Y., assignors to General Electric Company, a corporation of New York Application December 26, 1957, Serial No. 705,280

12 Claims. (Cl. 121—40)

This invention relates to a device for imparting step by step linear motion to a rod, and more particularly, to a device capable of imparting to the rod precisely defined increments of motion.

This device may find application in many situations in modern technology. It has the advantages of being very precise in its operation, being relatively impervious to high temperatures, and also being controllable from a position which is remote from the rod to be actuated.

Our invention is applicable, for example, in the control of cone deflectors of a jet engine, or other elements about the engine where it is necessary to operate at high ambient temperatures, and where the point of control must be remote from the element controlled. Similar uses are found in connection with rockets and missiles. The device also may be used in various types of machine tools where it is necessary axially to advance or reciprocate a shaft by precise increments.

The devices in the prior art for accomplishing these results have generally contained elements such as springs, which are subject to deterioration at high temperatures and, hence, have proved unreliable due to failure of such elements, or to a loss of precision as a result of the effects of a high temperature on these elements. The device which is the subject of this invention contains no elements which deteriorate at high temperatures, and, hence, can operate over a wide range of temperatures without loss of precision and without danger of failure due to deterioration of its parts.

An object of this invention is to provide an improved device for imparting linear motion to a rod in precisely defined increments.

A further object of this invention is to provide a device for imparting linear motion to a rod, which is capable of operation over a wide temperature range.

A still further object is to provide such a device which may be remotely controlled.

In accord with one embodiment of our invention, the shaft is actuated in step by step fashion by a pneumatically actuated piston. Means are provided alternately to lock the piston to the shaft to actuate it in response to pressure applied to either side of the piston and to unlock it therefrom when pressure is applied to the opposite side of the piston. Means are also provided to lock the shaft against reverse movement when the piston is moved back to its initial position by said last applied pressure.

The application of the pressure for operation of the locking means and the piston is controlled by a movable control member which, when moved in one direction, effects these operations in such sequence that the shaft is moved in step by step fashion in one direction and, upon reverse movement of the control member, the shaft is actuated in step by step fashion in the opposite direction.

In a modification of the invention, two pistons are provided which are alternately operated toward each other, and apart from each other, in a common cylinder. Means are provided for locking either piston to the shaft for actuating it while the other is unlocked therefrom. These means are so actuated in response to the movable control member that when either piston advances the shaft, the other is unlocked from it but returns to position to be locked to the shaft to effect the next advance of the shaft while the first piston is unlocked from it and returns to its initial position. Thus, the shaft is moved step by step. Upon reverse movement of the control member, the sequence of operation is reversed to cause reverse movement of the shaft.

The novel features which we believe to be characteristic of our invention are set forth in the accompanying claims. Our invention itself, however, both as to its structure and method of operation, together with further objects and advantages thereof, may best be understood by reference to the following description taken in connection with the accompanying drawing, in which—

Fig. 1 illustrates an embodiment of our invention, and

Fig. 2 illustrates a modification thereof.

In Fig. 1 is shown the rod 10 which, in the form of the invention illustrated, is to be reciprocated. This rod 10 has a plurality of teeth 10a upon its outer upper surface. Mounted within the cylinder are disks 14 and 15 having centrally located apertures therein to receive the rod. The disk or member 15 is fixedly mounted in the cylinder and is secured to the end plate 13 by a plurality of screws or other suitable fastening means, one of which is shown at 16.

The disk 14, which is sealed in fluid tight relation with the inner periphery of the cylinder 11, is movable through a limited space within the cylinder, its movement being restricted by annular stop members 17 and 18 which are mounted on the inner periphery of the cylinder 11 adjacent to fixed disk 15 and end plate 12, respectively. The disks 14 and 15 are formed to include radial bores 19 and 20. Mounted in the bores 19 and 20 in the disks 14 and 15 are detents 21 and 22, respectively, having teeth 21a and 22a on their lower surfaces, which slidably move in the bores to engage the teeth on the top surface of the rod 10. These detents also have slots cut in their upper surface through which pins 23 extend to constrain the detents against rotational movement while still permitting radial movement in the bores. The disks are also provided with circumferential grooves 24 and 25, sealed against the inner periphery of the cylinder 11, which permit the passage of high pressure fluid from high pressure lines 2a and 3a to the detents 21 and 22, respectively. Communication between the pressure lines 2a and 3a and the circumferential grooves 24 and 25 is provided by passageways 26 and 27 in the disks 14 and 15, respectively.

Low pressure fluid is continually supplied to the space between the two disks 14 and 15 by low pressure line 4a, this low pressure being sufficient to move the disk 14 when high pressure fluid is not applied to its other face. Annular fluid spaces 28 are provided at the apertures in each of the disks so that this low pressure fluid which exists between the disks may communicate with the lower surfaces of the detents 21 and 22. Thus, it can be seen that when high pressure fluid is applied to the upper surfaces of the detents through the high pressure lines 2a and 3a, the detents will be forced downwardly into engagement with the teeth on the upper surface of the rod; but when the high pressure fluid is not applied, the low pressure fluid which is continuously supplied to the chamber between the disks will force the detents upwardly out of engagement with the teeth.

High pressure fluid is also supplied through pressure line 1a, which extends through end plate 12 to the face of movable disk 14 which is remote from the fixed disk 15. When the disk 14 is engaged with the rod 10 through the action of its detent 21, it can be seen that application of high pressure fluid to the face of the disk 14 through high pressure line 1a will cause the disk and rod to be moved by this high pressure fluid as in an expansible chamber fluid motor.

The fluid pressure lines are all supplied from a common source 5a, and each of these lines 1a, 2a, and 3a has a valve 1b, 2b, and 3b, respectively, in it. These valves are operated in a predetermined sequence by a suitable control mechanism which, in the embodiment illustrated, comprises solenoids 1c, 2c, and 3c which, in turn, are controlled by cam actuated switches 1d, 2d, and 3d. The cams 1e, 2e, and 3e, which control the switches 1d, 2d, and 3d, are so designed that upon rotation of the crank 29 in counterclockwise direction, the switches and, in turn, the valves, are operated in such a way as to move the rod 10 from left to right, and when the crank 29 is rotated in a clockwise direction the rod is actuated from right to left.

The operation of the device is as follows: The various positions of the cams are indicated by the radial lines 1–6 marked upon the cams. The cams are shown in position 1, where the switches 1d and 2d are open and the switch 3d is closed. In this position, switch 1d is open and valve 1b is closed. Therefore, no high pressure fluid is supplied through line 1a to the face of the disk 14. Similarly, switch 2d is open and valve 2b is closed, and no high pressure fluid is supplied through line 2a to the space above the detent 21. Therefore, the detent 21 is raised out of engagement with the teeth by the force of the low pressure fluid which exists between the disks, and the disk 14 is forced to its extreme left position also by the force of this fluid.

Also, in this position 1, the switch 3d is closed and valve 3b is open to admit high pressure fluid above the detent 22, which forces the detent 22 down into engagement with the teeth on the rod 10, thus locking the rod in its position relative to the cylinder.

Rotation of the crank 29 in a clockwise direction to position 6 closes the switch 2d while the switch 3d remains closed and the switch 1d remains open. The closing of the switch 2d opens the valve 2b, thus admitting high pressure fluid above the detent 21 and driving the detent down into engagement with the teeth on rod 10.

Further rotation of the crank to position 5 causes opening of the switch 3d while the swtich 2d remains closed and the switch 1d remains open. The opening of the switch 3d closes the valve 3b, thus cutting off the high pressure fluid above the detent 22. When this high pressure fluid above the detent is removed, the detent 22 is forced upwardly out of engagement with the rack due to the pressure of the low pressure fluid between the two disks.

In position 4, the switch 1d is closed, while the switch 2d remains closed and the switch 3d remains open. The closing of the switch 1d opens the valve 1b and admits high pressure fluid to the face of the disk 14, which is remote from the fixed disk 15. The force of this fluid causes the disk, and likewise the rod, which is engaged with the disk 14 by the detent 21, to move to the right until this movement is stopped by stop member 17.

Rotation of the cams to the position 3 recloses contacts 3d, thus opening valve 3b and admitting high pressure fluid above the detent 22. This causes the detent 22 to move again downwardly into engagement with the teeth on the rod 10.

Further clockwise rotation of the cams to position 2 causes switch 2d to open, thus closing the valve 2b and cutting off the high pressure fluid from above the detent 21. Detent 21 is then forced upwardly out of engagement with the teeth on the rod 10 by the force of the low pressure fluid which exists between the two disks.

The cams are then rotated to the position 1, wherein the switch 1d is opened. This closes valve 1b and cuts off the high pressure fluid in the chamber between end plate 12 and the movable disk 14. Upon removal of this high pressure fluid, the disk 14 is forced back to its position against stop member 18 by the action of the low pressure fluid between the two disks.

Thus, one complete clockwise revolution of crank 29 causes the rod 10 to be advanced to the right a distance equal to the amount of motion which is permitted the movable disk 14 between the two stop members 17 and 18.

Similarly, rotation of the crank in a counter-clockwise rotation causes a complete reversal in the series of operations previously recited and, therefore, the rod 10 is moved to the left a distance which is defined by the amount of motion permitted the disk 14 between stop members 17 and 18 for each counterclockwise rotation of the crank 29.

Of course, when in the clockwise rotation the cams reach position 4, the high pressure is cut off from both high pressure lines 1a and 3a and low pressure from line 48 applied between the two disks moves disk 14 to the left to the position shown.

While it would be possible in the operation of this device to use any suitable fluid at any pressure, it has been found that air at 50 pounds per square inch pressure in the high pressure lines and 25 pounds per square inch in the low pressure lines produces very satisfactory results.

Referring now to Fig. 2, there is shown a second embodiment of this invention wherein two disks 50 and 51 are movable within the cylinder 52 as contrasted with the single movable disk 14 in Fig. 1. In this form of the invention, the shaft is actuated through two steps in either direction in response to each rotation of the crank in the respective direction.

Here again, the cylinder 52 provides the main body of the actuating device, and its ends are sealed by end plates 53 and 54 which are secured to the cylinder 52 or integral with it, and through which the rod 55 passes. Each of the disks 50 and 51, which have centrally located apertures to receive the rod 55, is mounted for limited sliding axial motion within the cylinder 52, and is sealed in fluid tight relationship with the inner periphery of the cylinder 52. The disk 50 moves between annular stop member 56, mounted around the rod 55 at end plate 53, and centrally located annular stop member 57, mounted on the inner periphery of cylinder 52, while the disk 51 moves between the centrally located stop member 57 and the end plate 54 of the cylinder.

The disks 50 and 51 are formed to include radial bores 58 and 59, respectively. Mounted in disk 50 for radial sliding motion in bore 58 is detent 60, and the disk 51 has a similar detent 61 in the bore 59. These detents have teeth 60a and 61a in their lower surface, which are adapted to engage the teeth 55a in the upper surface of a rod 55, and they have slots on their upper surface which cooperate with pins 62 to constrain the detents against rotational movement while permitting the detents to move radially in the bores.

High pressure fluid may be introduced in the bores 58 and 59 by the pressure lines 41a and 42a, respectively, which pass through the cylinder 52, to force the detents downwardly into engagement with the teeth on the rod 55. Low pressure fluid is constantly maintained in the chamber 63 between the two disks 50 and 51, this low pressure being sufficient to move either of the disks when high pressure is not applied to their opposite faces. Both of the disks 50 and 51 are provided with annular fluid spaces 64 which permit conduction of low pressure fluid from the chamber 63 to the underside of the detents 60 and 61 so that upon cutting off of the high pressure fluid above the detents, the detents are forced upwardly out of engagement with the rod by the low pressure fluid in the passage 64. High pressure fluid may be introduced into the chambers 65 and 66 at the outer side of the disks in accordance with a predetermined cycle of operation, so that when the appropriate disk is engaged with the rod, the high pressure fluid in an appropriate chamber will cause the disk and rod to be moved by this high pressure fluid as in an expansible chamber fluid motor. The low pressure fluid is supplied through low pressure line 43a, while the high pressure fluid in chambers 65 and 66 is supplied by high pressure lines 40a, which pass through the end plates 53 and 54.

The high pressure lines 40a, 41a, and 42a are all supplied from a common source 5a, and are controlled respectively by valves 40b, 41b, and 42b, which, in turn, are actuated by solenoid devices 40c, 41c, and 42c. These solenoids are controlled by switches 40d, 41d, and 42d, controlled by cams 40e, 41e, and 42e. As in the form shown in Fig. 1, the fluid is admitted to the various chambers in the cylinder in accordance with a predetermined sequence defined by the configuration of the cam surfaces to impart linear motion to the rod 55.

The operation of this form of the invention is as follows: The various positions on the cams are indicated by the radial lines 1 through 6. When the cams are in position 6, as shown, the switch 40d is open and the switches 41d and 42d are closed. Thus, the valves 41b and 42b are open, admitting high pressure fluid through the lines 41a and 42a to the chambers defined by the bores 58 and 59 above the detents 60 and 61, and the detents are forced downwardly into engagement with the rod 55 and locking shaft 55 in the position shown. The valve 40b is closed so no high pressure fluid is supplied in the chambers 65 and 66 and, therefore, both of the disks 50 and 51 are forced to their outermost position by the low pressure fluid in the chamber 63, having been actuated to that position in response to previous movement of the crank. In this position, disk 50 abuts against stop member 56, and the disk 51 abuts against end plate 54. In this position, they are locked by the detents 60 and 61, respectively.

When the crank 67 is rotated clockwise to position 5, the valve 40b remains closed and valve 41b remains open. However, the valve 42b closes since the switch 42d opens by the action of the cam surface 42e. The closing of the valve 42b cuts off the high pressure fluid above the detent 61 in the disk 51, and the detent is forced upwardly out of engagement with the rod 55 by the action of the low pressure fluid in the annular space 64.

Rotation of the crank 67 to position 4 closes the switch 40d, thus opening valve 40b. Opening of the valve 40b admits high pressure fluid to the two chambers 65 and 66, thus forcing both of the disks 50 and 51 to their innermost position where they abut against stop member 57. In this motion, the detent 60 on disk 50 is engaged with the rod 55, and the motion of the disk from stop member 56 to centrally located stop member 57 moves the rod 55 to the right a distance equal to the amount of motion permitted the disk member 50.

Rotation of the crank 67 to the position 3 closes switch 42d, thus opening valve 42b and admitting high pressure fluid through the line 42a to the chamber above the detent 61, thus driving detent 61 downwardly into engagement with the teeth on the rod 55 thereby locking the shaft 55 in its advanced position. The valves 40b and 41b remain open during this rotation so the disks are held in their central position, and the detent 60 is still engaged with the rod 55.

Further rotation to position 2 opens switch 41d, thus closing valve 41b and cutting off high pressure fluid above the detent 60, and the detent 60 is forced upwardly out of engagement with the rod 55 by the action of the low pressure fluid in the annular space 64.

Rotation of the crank to position 1 opens the switch 40d, thus closing the valve 40b and cutting off the high pressure fluid from the chambers 65 and 66. The positions of the valves 41b and 42b are not changed, so the detent 60 remains disengaged and the detent 61 remains engaged with the rod. As the high pressure fluid is cut off from the chambers 65 and 66, the low pressure fluid in the chamber 63 causes the disks 50 and 51 to move to their outward positions where the disk 50 abuts against stop member 56 and the disk 51 abuts against end plate 54. Since the disk 51 was engaged with the rod 55 through the action of detent 61, the motion of the disk 51 again carries the rod along with it, thus imparting to the rod a second linear motion to the right equal to the amount of travel permitted the disk 51 between centrally located stop member 57 and end plate 54.

Rotation of the crank back to position 6 closes switch 41d, thus opening valve 41b and again admitting fluid to the chamber defined by the bore 58 above the detent 60 and causing detent 60 once again to engage the teeth on the rod 55.

Thus, it can be seen that with one complete clockwise rotation of the crank 67, a complete cycle of operation is completed, and the rod 55 is advanced to the right by two steps an amount equal to the sum of the distances of free travel of the disks 50 and 51.

More briefly stated, in position 4 of the crank both pistons 60 and 61 move to their inward positions, piston 60 moving the shaft to the right. In position 1 of the crank, both pistons move apart—piston 61 moving the shaft to the right. On each advance of the shaft by either piston, the other piston moves in the opposite direction and then becomes locked to the shaft by its detent to retain the shaft in its advanced position and to advance it further by its next movement in the direction of movement of the shaft.

In other words, as the pistons move toward each other one of them advances the shaft while the other moves in the opposite direction to its position of readiness to effect the next advance of the shaft. As they move apart, said other piston advances the shaft in the same direction as before while said one piston moves back to its position of readiness again to effect the next advancement of the shaft.

This operation repeats itself continuously during rotation of the crank in either direction, thus advancing the shaft two steps for each rotation of the crank.

Whereas in Fig. 1 the piston is advanced by piston 14 and its detent 21, member 15 and its detent 22 merely serving as a holding device retaining the shaft in its advanced position while piston 14 goes back for its next step, in Fig. 2 both pistons serve both of these functions during alternate intervals. As each piston advances the shaft, the other piston comes back to hold the shaft in its advanced position and to advance it while the other goes back for its next step. Thus, in effect, the device of Fig. 2 may be likened to two of the devices of Fig. 1 working on the same shaft in proper time relationship to permit some integration of parts.

While particular embodiments of this invention have been shown and described, further modifications will occur to those skilled in the art. It is to be understood, therefore, that this invention is not limited to the specific embodiments shown, and it is intended that the appended claims cover all modifications which do not depart from the spirit and scope of this invention.

What we claim as new and desire to secure by Letters Patent of the United States is:

1. In combination, a closure, a rod extending through said closure for movement longitudinally of itself, a piston within said closure movable axially of said rod, means to lock the piston to the rod, means to apply pressure to the piston to move the rod in one direction when the piston is locked to the rod, means to unlock the piston from the rod and to move the piston in the other direction when the piston is unlocked therefrom, and means to prevent reverse movement of the rod during movement of said piston in said other direction.

2. In combination, a closure, a rod extending through said closure for movement longitudinally of itself, a piston within said closure movably axially of said rod, means to lock the piston to the rod, means to apply pressure to the piston to move the rod in one direction when the piston is locked to the rod, means to unlock the piston from the rod and to move the piston in the other direction when the piston is unlocked therefrom, and means to prevent reverse movement of the rod during movement of said piston in said other direction, movable control means, and means responsive to movement thereof to actuate said locking means, pressure applying means, and preventing means in such sequence as to effect step by step movement of said rod in accord with corresponding movement of said control means.

3. In combination, a closure, a rod extending through said closure for movement longitudinally of itself, a piston within said closure movable axially of said rod, means to lock the piston to the rod, means to apply pressure to the piston to move the rod in one direction when the piston is locked to the rod, means to unlock the piston from the rod and to move the piston in the other direction when the piston is unlocked therefrom, and means to prevent reverse movement of the shaft during movement of said piston in said other direction, and a control member movable in either of two directions, means responsive to movement of said control member in either direction to operate said pressure supply means, said locking means and said preventing means in such sequence as to cause said rod to move step by step in either direction dependent upon the direction of movement of said control member.

4. In combination, a closure, a rod extending through said closure for movement longitudinally of itself, a piston within said closure movable axially of said rod, means to lock the piston to the rod, means to apply pressure to the piston to move the rod in one direction when the piston is locked to the rod, means to unlock the piston from the rod and to move the piston in the other direction when the piston is unlocked therefrom, and means further to advance said rod in said one direction during movement of said piston in said other direction.

5. In combination, a shaft, a piston arranged for movement longitudinally of the shaft, means to lock said piston to said shaft and to apply pressure to said piston to cause it to actuate said shaft longitudinally of itself in either direction, and means to lock the shaft against reverse movement, to unlock said piston from the shaft, and to apply pressure to move said piston in the reverse direction while the shaft is locked against reverse movement.

6. In combination, a shaft, a piston arranged for movement longitudinally of the shaft, means to lock said piston to said shaft and to apply pressure to said piston to cause it to actuate said shaft longitudinally of itself in either direction, and means to lock the shaft against reverse movement, to unlock said piston from the shaft, and to apply pressure to move said piston in the reverse direction, a second piston arranged for movement longitudinally of the shaft, means to apply pressure thereto to cause it to move simultaneously with said first piston and in the opposite direction, said second piston having means to lock it to the shaft, said locking means for said two pistons being actuated in alternation, whereby when either piston is locked to the shaft for actuation thereof the other piston is unlocked therefrom.

7. In combination, a shaft, a cylinder, a pair of pistons arranged for reciprocation in said cylinder, means alternately to apply pressure between said pistons to move them apart and to apply pressure against their outer surfaces to move them together, a shaft extending longitudinally of said cylinder, means to lock said pistons to said shaft to move the shaft with the respective piston in alternation and in synchronism with said first means whereby when either piston moves the shaft the other is unlocked therefrom, and moves in the opposite direction to position to effect further movement upon the next applied pressure.

8. The combination of claim 7 with means to reverse the sequence of applied pressures and operation of said locking means to effect reverse movement of the shaft.

9. In combination, a cylinder, two pistons in said cylinder, a shaft extending through said pistons, a pneumatically operated detent carried by each piston to lock the respective piston to said shaft, means to apply a pressure difference across said pistons to move them apart, means to apply an opposite pressure difference across said pistons to move them together, and means whereby when said first pressure difference is applied the detent carried by one piston is operated to lock the respective piston to the shaft to move said shaft and the other detent unlocks its piston from the shaft and when said opposite pressure difference is applied the other detent locks its piston to the shaft for movement therewith and the first detent unlocks its piston from the shaft.

10. In combination, a closure, a piston in said closure, a shaft extending through said piston, a bore in said piston at an angle to and intersecting said shaft, said bore carrying a second piston adapted to engage said shaft, means to apply a pressure difference across said first and second pistons to cause said second piston to engage said shaft and to cause said first piston to move said shaft through a range of movement, and means to reverse said pressure differences to move said second piston out of engagement with said shaft and to move said first piston in the opposite direction.

11. In combination, a closure, a piston in said closure, a shaft extending through said piston, a bore in said piston at an angle to and intersecting said shaft, said bore carrying a second piston adapted to engage said shaft, means to apply a pressure difference across said first and second pistons to cause said second piston to engage said shaft and to cause said first piston to move said shaft through a range of movement, and means to reverse said pressure differences to move said second piston out of engagement with said shaft and to move said first piston in the opposite direction, and means to lock the shaft against reverse movement during said last movement of said first piston.

12. In combination, a disk, a shaft through said disk to be reciprocated thereby, a bore in said disk intersecting said shaft, a detent in said bore adapted to engage said shaft, means to apply a pressure differential across said disk to actuate it in one direction and an opposite pressure differential to actuate it in the opposite direction, and means to actuate said detent into engagement with said shaft to actuate said shaft in response to one of said pressure differentials and out of engagement with said shaft in response to the opposite pressure differential.

References Cited in the file of this patent

UNITED STATES PATENTS

| | | |
|---|---|---|
| 2,181,562 | De Ganahl et al. | Nov. 28, 1939 |
| 2,442,577 | Ashton | June 1, 1948 |